(12) United States Patent
Tseng

(10) Patent No.: US 9,195,459 B2
(45) Date of Patent: Nov. 24, 2015

(54) SIMULTANEOUSLY ACCESSIBLE MEMORY DEVICE AND METHOD FOR USING THE SAME

(71) Applicant: Min-Sung Tseng, Hsinchu County (TW)

(72) Inventor: Min-Sung Tseng, Hsinchu County (TW)

( * ) Notice: Subject to any disclaimer, the term of this patent is extended or adjusted under 35 U.S.C. 154(b) by 229 days.

(21) Appl. No.: 13/872,014

(22) Filed: Apr. 26, 2013

(65) Prior Publication Data
US 2014/0325162 A1    Oct. 30, 2014

(51) Int. Cl.
*G06F 12/00*    (2006.01)
*G06F 9/30*    (2006.01)
*G06F 11/14*    (2006.01)

(52) U.S. Cl.
CPC ............. *G06F 9/3004* (2013.01); *G06F 11/14* (2013.01)

(58) Field of Classification Search
CPC ............. G06F 9/00; G06F 11/14; G06F 9/30; G06F 11/1444
See application file for complete search history.

(56) References Cited

U.S. PATENT DOCUMENTS

| 3,668,644 | A | * | 6/1972 | Looschen | 714/6.24 |
| 4,404,647 | A | * | 9/1983 | Jones et al. | 714/5.1 |
| 5,611,042 | A | * | 3/1997 | Lordi | 714/6.1 |
| 6,662,292 | B1 | * | 12/2003 | Wilson | 711/220 |
| 7,907,470 | B2 | * | 3/2011 | Ware et al. | 365/230.06 |
| 2006/0095665 | A1 | * | 5/2006 | Tsai | 711/114 |
| 2011/0066805 | A1 | * | 3/2011 | Janschitz et al. | 711/115 |

* cited by examiner

*Primary Examiner* — John Lane

(57) ABSTRACT

A memory device is provided with an instruction decoding unit, a control and logic unit, a first memory, and a second memory. The memory device serves to decode an inputted instruction and producing a decoding signal. The control and logic unit serves to produce a control signal based on the decoding signal. The first memory has a first memory array and a first page buffer, and the second memory with a second memory array and a second page buffer. When the inputted instruction is a preset instruction, the preset instruction is used to simultaneously execute data access on a first memory and access the backup data on a second memory based on a same data.

7 Claims, 12 Drawing Sheets

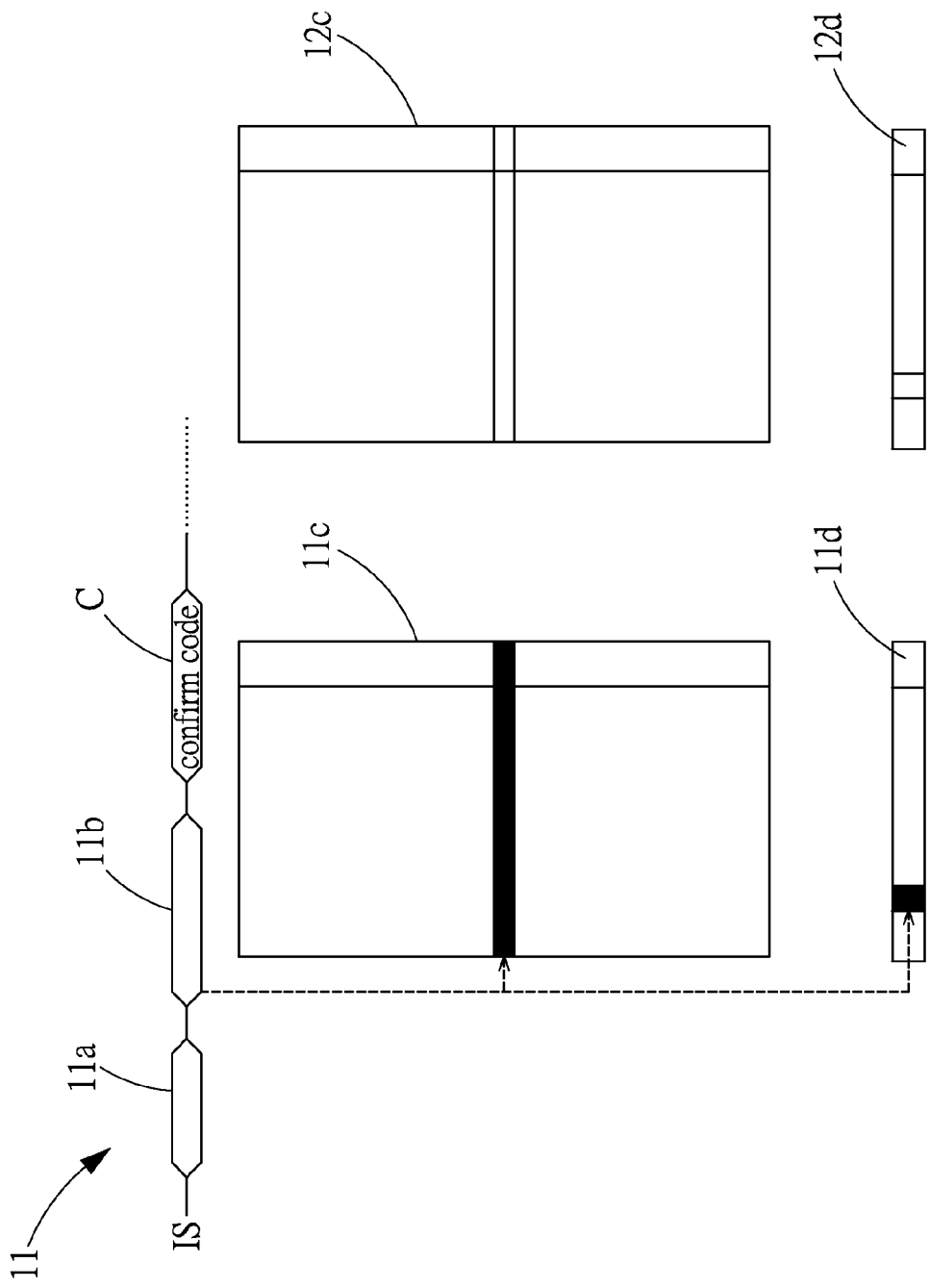

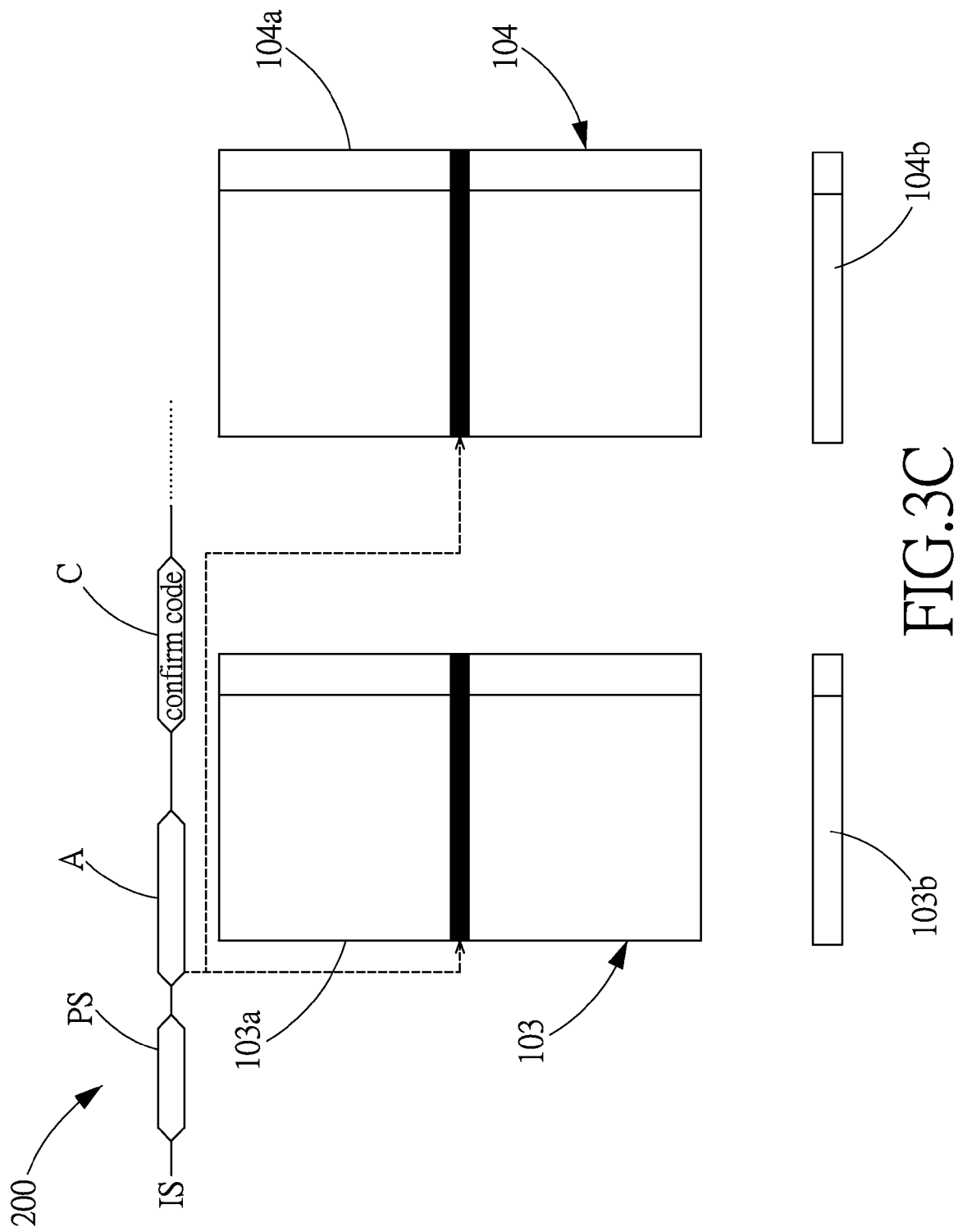

SIMULTANEOUSLY ACCESSIBLE MEMORY DEVICE AND METHOD FOR USING THE SAME

BACKGROUND OF THE INVENTION

1. Field of the Invention

The present invention relates to a memory device, and more particularly to a highly reliable memory device with high performance in read, write and erase.

2. Description of the Prior Art

With the development of memory technology, the storage capacity for a memory device is also increased, while the cost for each byte of storage space of the memory device is correspondingly reduced. Therefore, enhancing the processing performance, reliability of the memory device, and ensuring accurate, fast and safe operation of the data have become our main goal.

Referring to FIG. 1A, a prior art memory device is reading a page of data from a memory array. Since the IS (instruction) inputted in the memory device 11 includes a command code 11a, an address code 11b, and a confirm code C. The address code 11b provides access to the page buffer 11d of a memory array 11c and read access to the data stream of the memory array 11c, and the confirm code C enables the execution of reading.

FIG. 1B shows that a prior art memory device 11 is reading a page of data from two memory arrays. The execution of reading of two memory arrays 11c and 12c, the inputted instruction must comprises two command codes 11a and 12a, and two address codes 11b and 12b. The two address codes 11b and 12b provide access to the page buffers 11d and 12d of the memory arrays 11c and 12c, respectively, for the execution of the reading of the data stream of the memory arrays 11c and 12c. Therefore, it will take more time for the memory device 11 to process the inputted instruction.

Similarly, as shown in FIGS. 1C-1F, wherein FIG. 1C shows that the prior art memory device is programming data into a page of a memory array, FIG. 1D shows that the prior art memory device is programming data into a page of two memory arrays, FIG. 1E shows that the prior art memory device erases data from a memory array, and FIG. 1F shows that the prior art memory device erases data from two memory arrays. The operation theory of FIGS. 1C-1F is the same as FIGS. 1A and 1B, further explanation would be omitted. Hence, it is impossible for the existing memory devices to perform read, program or erase to multiple memories with only a single instruction. The data accuracy in the memory cannot be guaranteed if mistakes or errors occur during reading and writing, and therefore, the existing flash memory devices are unreliable.

The present invention has arisen to mitigate and/or obviate the afore-described disadvantages.

SUMMARY OF THE INVENTION

The primary objective of the present invention is to provide a simultaneously accessible memory device which is capable of performing data read, program or erase simultaneously in multiple memories.

Another objective of the present invention is to provide a simultaneously accessible memory device with high performance in processing.

Yet another objective of the present invention is to provide a simultaneously accessible memory device with high reliability.

To achieve the above objective, a simultaneously accessible memory device in accordance with the present invention comprises: an instruction decoding unit, a control and logic unit, a first memory, and a second memory. The memory device serves to decode an inputted instruction and producing a decoding signal. The control and logic unit serves to produce a control signal based on the decoding signal. The first memory has a first memory array and a first page buffer, and the second memory with a second memory array and a second page buffer. When the inputted instruction is a preset instruction, the preset instruction is used to simultaneously execute data access on a first memory and access the backup data on a second memory based on a same data, namely, the same data is read from or written into the first and second memories simultaneously.

A method for using the simultaneously accessible memory device in accordance with the present invention comprises the steps of:

decoding an inputted instruction and producing a decoding signal;

producing a control signal based on the decoding signal;

when the inputted instruction is a preset instruction, using the preset instruction to simultaneously execute data access on a first memory and access the backup data on a second memory based on same data.

BRIEF DESCRIPTION OF THE DRAWINGS

FIG. 1A shows that a prior art memory device is reading a page of data from a memory array;

FIG. 3C shows a simultaneously accessible memory device in accordance with a fifth embodiment of the present invention.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1B:
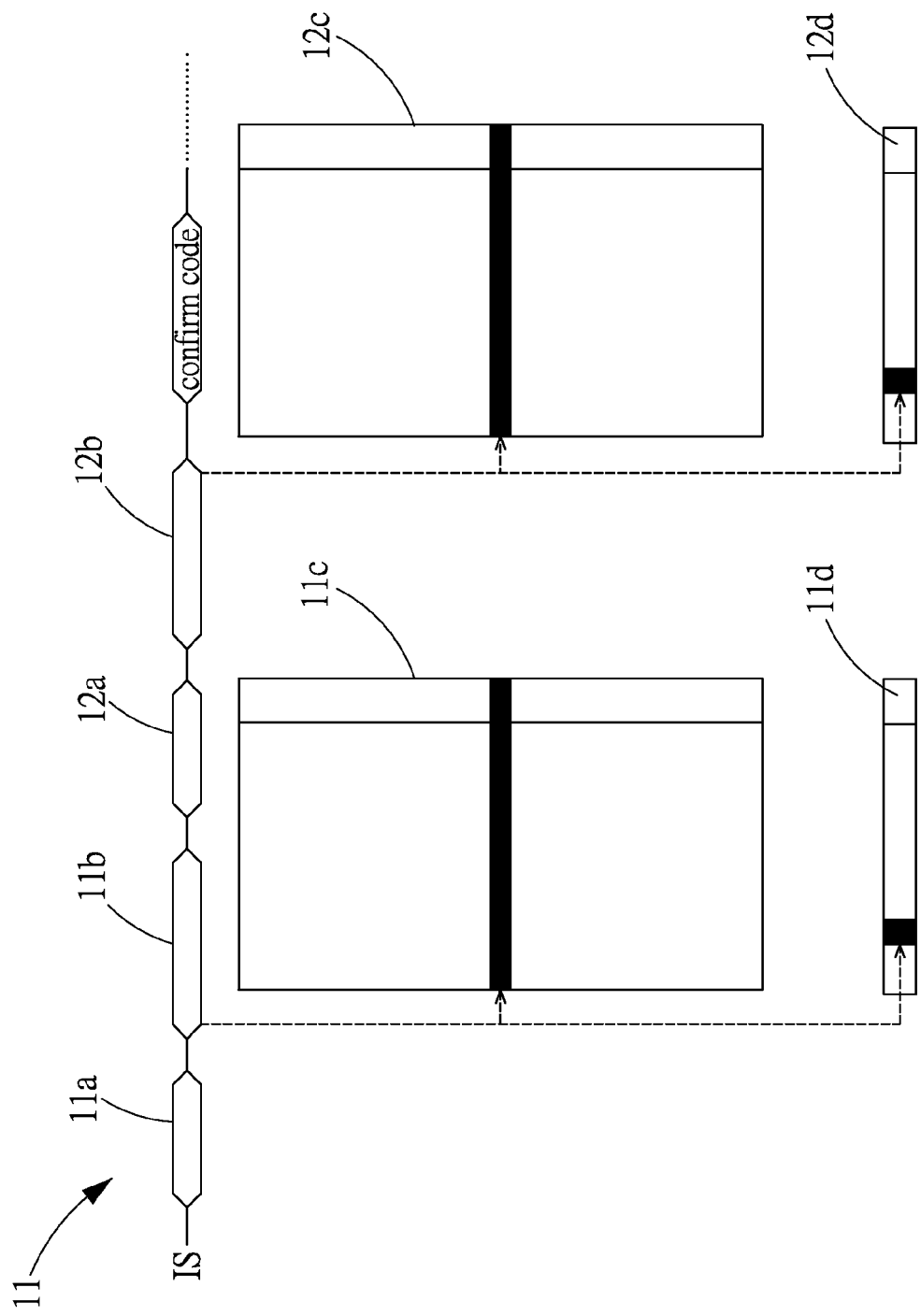
FIG. 1B shows that a prior art memory device is reading a page of data from two memory arrays.
Figure 1C:
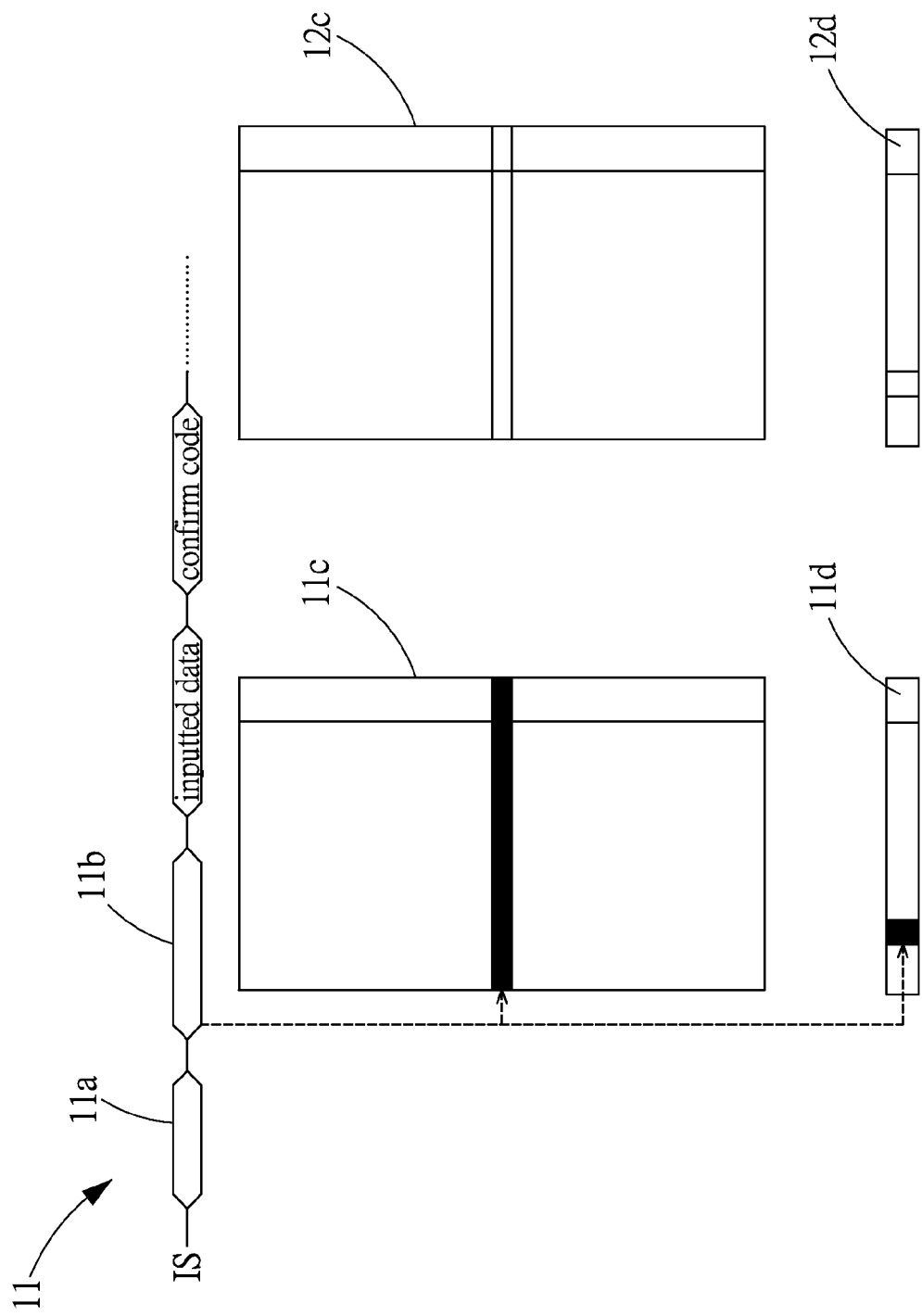
FIG. 1C shows that the prior art memory device is programming data into a page of a memory array.
Figure 1D:
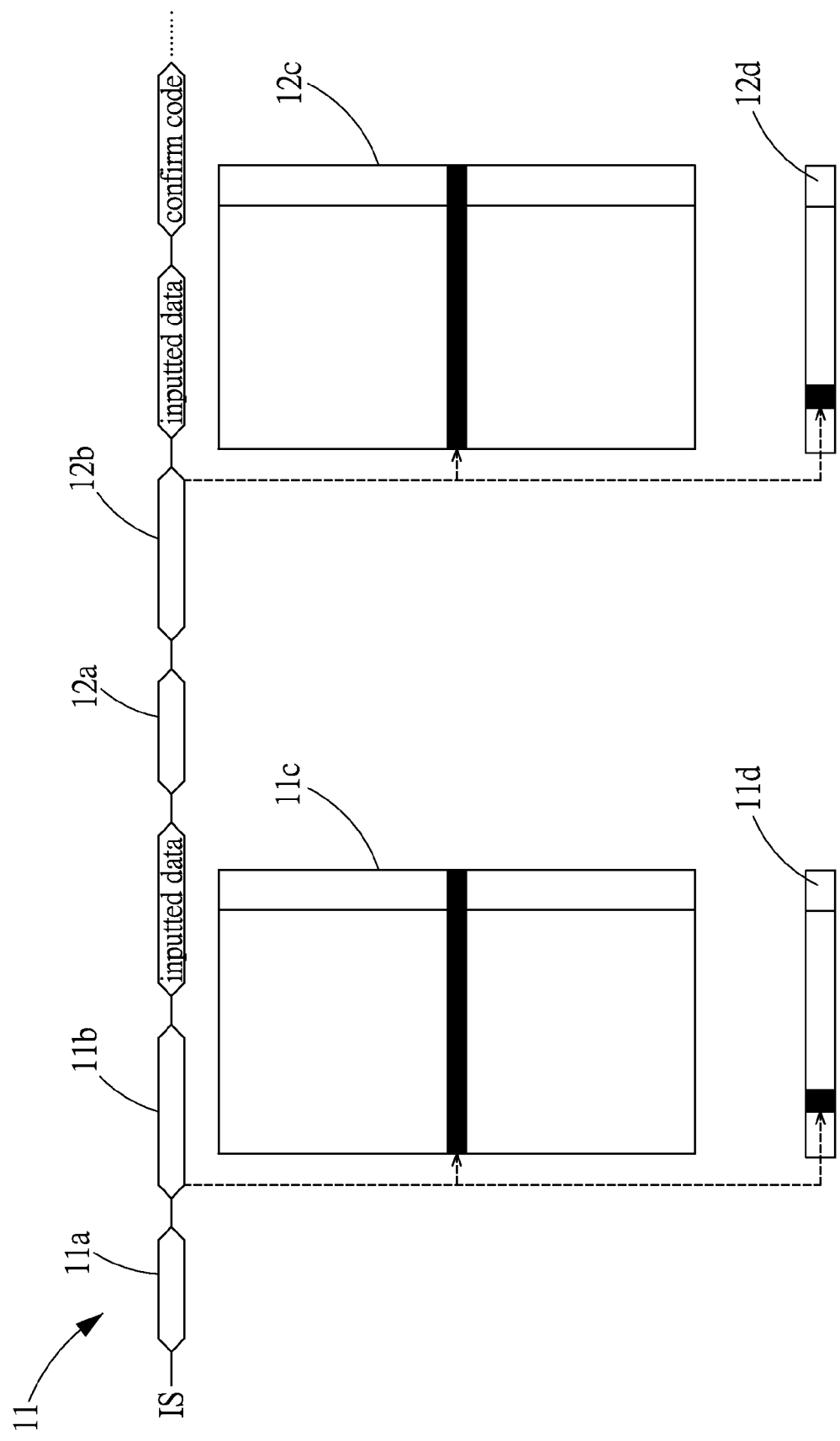
FIG. 1D shows that the prior art memory device is programming data into a page of two memory arrays.
Figure 1E:
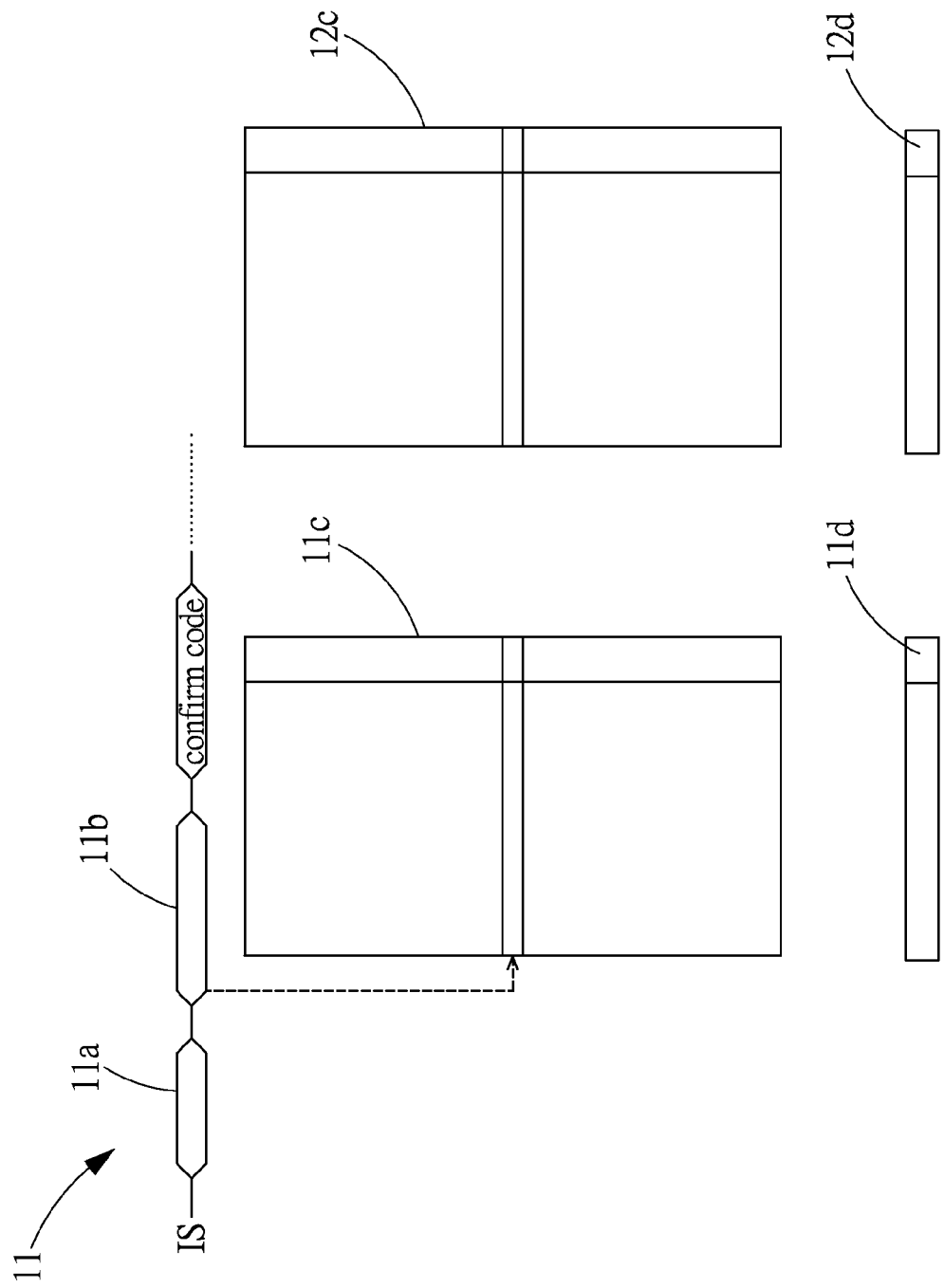
FIG. 1E shows that the prior art memory device erases data from a memory array.
Figure 1F:
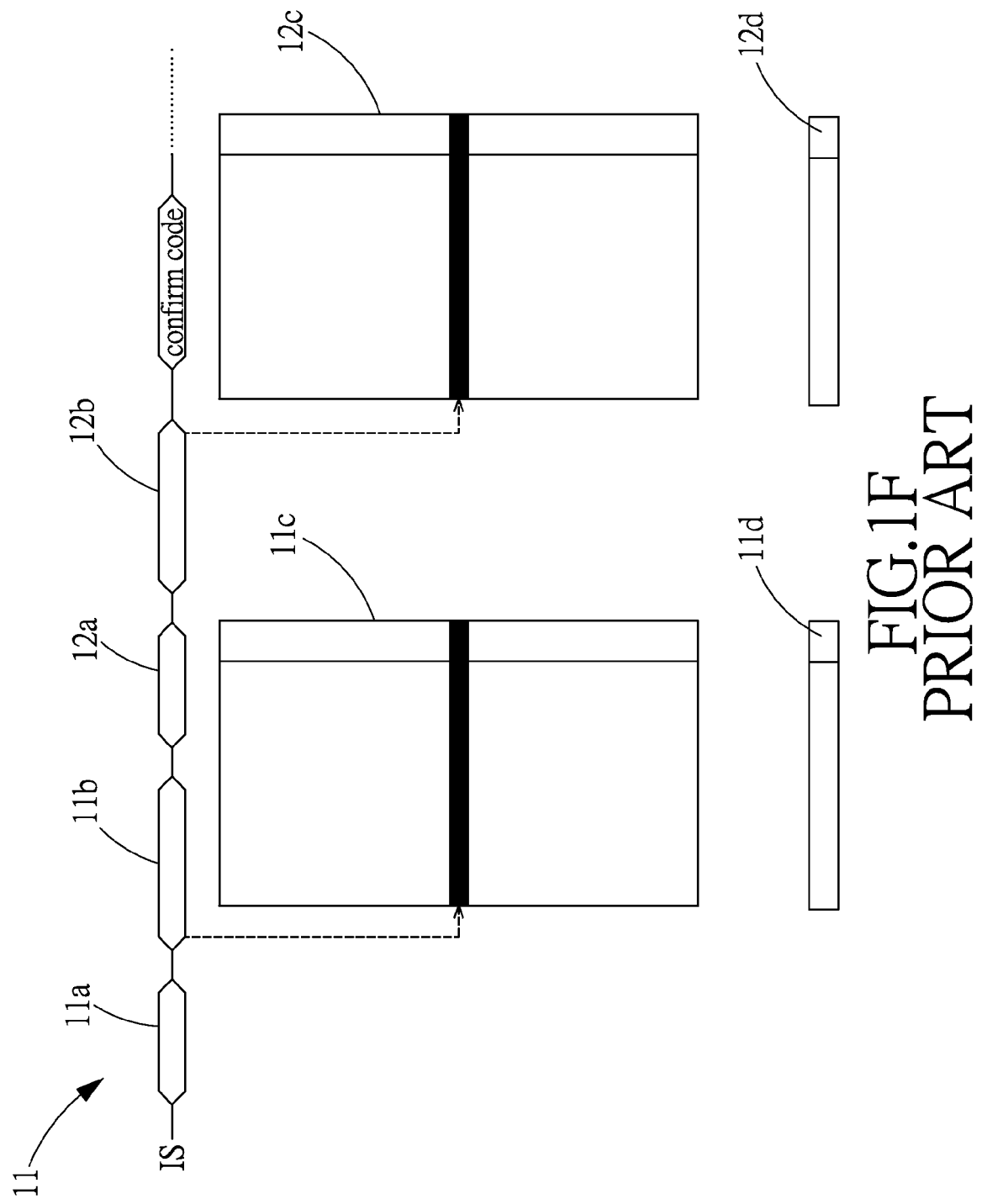
FIG. 1F shows that the prior art memory device erases data from two memory arrays.
Figure 2A:
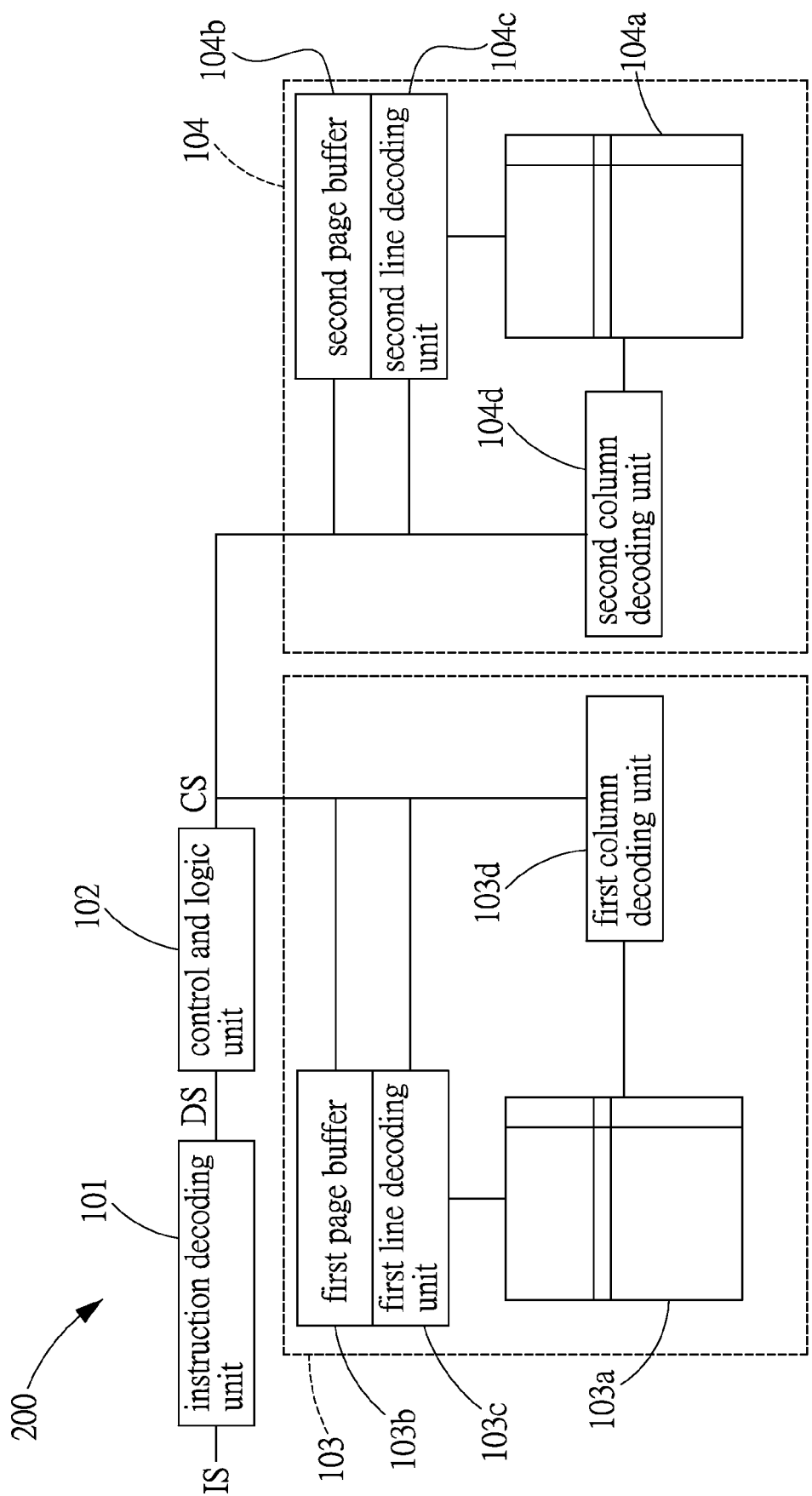
FIG. 2A shows a simultaneously accessible memory device in accordance with a first embodiment of the present invention.

Referring to FIG. 2A, a simultaneously accessible memory device 200 in accordance with a first embodiment of the present invention is shown and comprises: an instruction decoding unit 101, a control and logic unit 102, a first memory 103 and a second memory 104.

It is to be noted that the memory device 200 of the first embodiment of the present invention is a NAND flash memory, and can also be a solid state disk (SSD) or in any other available forms.

The first memory 103 includes a first memory array 103a and a first page buffer 103b, and the second memory 104 includes a second memory array 104a and a second page buffer 104b. The first page buffer 103b is connected to the control and logic unit 102 and the first memory array 103a, and the second page buffer 104b is connected to the control and logic unit 102 and the second logic array 104a.

When the instruction decoding unit 101 receives an IS (inputted instruction), it will produce a DS (decoding signal) based on the IS, then the control and logic unit 102 produces a CS (control signal) based on the DS to make the first and second memory arrays 103a, 104a perform read, program and erase operations.

When the IS is a PS (preset instruction), the PS is used to simultaneously execute data access on the first memory 103 and access the backup data on the second memory 104 based on the same data. The data access means the process of read, program and erase, and the access the backup data means that the first and second memories 103, 104 execute the same operation at the same time. In other words, when the IS is PS, the decoding unit 101 decodes the PS and produces a DS, then the control and logic unit 102 produces a CS based on the DS and simultaneously enables the first memory array 103a, the first page buffer 103b, the second memory array 104a and the second page buffer 104b to execute the read, program and erase operations.

In one preferred embodiment, the PS can be considered as a data access and backup instruction which comprises a first instruction to activate the first memory and a second instruction to activate the second memory. Therefore, the data access and backup instruction can enable the first and second memories 103, 104 to perform data access and backup.

It is to be noted that when the IS is not a PS in accordance with another embodiment, namely, when the IS is a NS (normal instruction), the control and logic unit 102 will produce a CS based on the DS so as only to enable the first memory array 103a and the first page buffer 103b to execute read, program and erase operations rather than enabling the second memory array 104a and the second page buffer 104b to execute the read, program and erase operations.

Figure 2B:
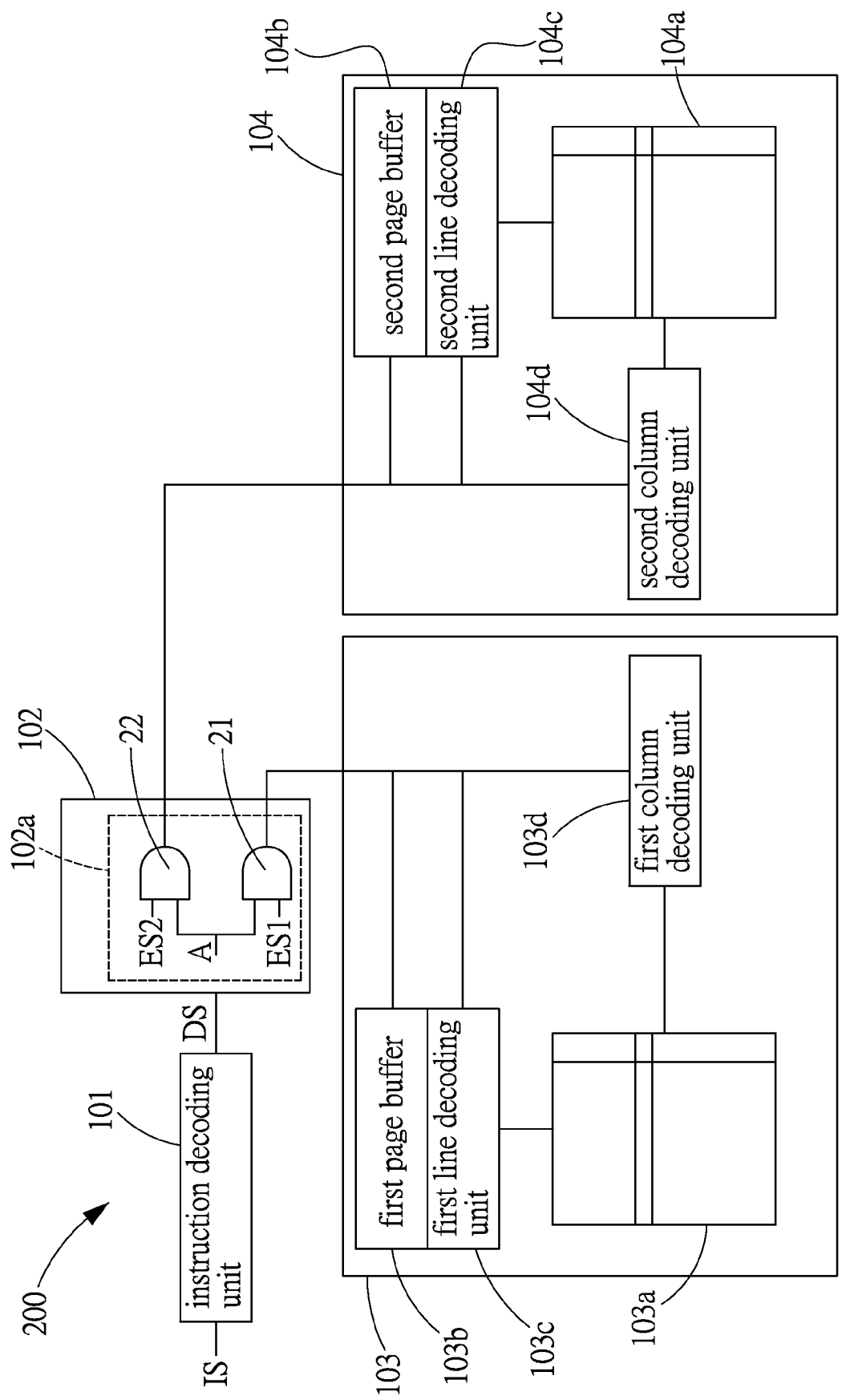
FIG. 2B shows a simultaneously accessible memory device in accordance with a second embodiment of the present invention.

Referring then to FIG. 2B, which shows a memory device in accordance with a second embodiment of the present invention, wherein the control and logic unit 102 comprises a decision unit 102a connected to the instruction decoding unit 101, and the decision unit 102a is used to decide whether the IS is a PS or a NS.

It is to be noted that, when the IS is PS, the DS will include an ES1 (enable signal) and an ES2.

In a preferred embodiment, the decision unit 102a further comprises a first AND gate 21 and a second AND gate 22. The first AND gate 21 has a first end connected to the instruction decoding unit 101 to receive an Address code A and has a second end connected to the ES1. The second AND gate 22 has a first end connected to the instruction decoding unit 101 to receive the address code A and has a second end connected to the ES2.

Figure 3A:
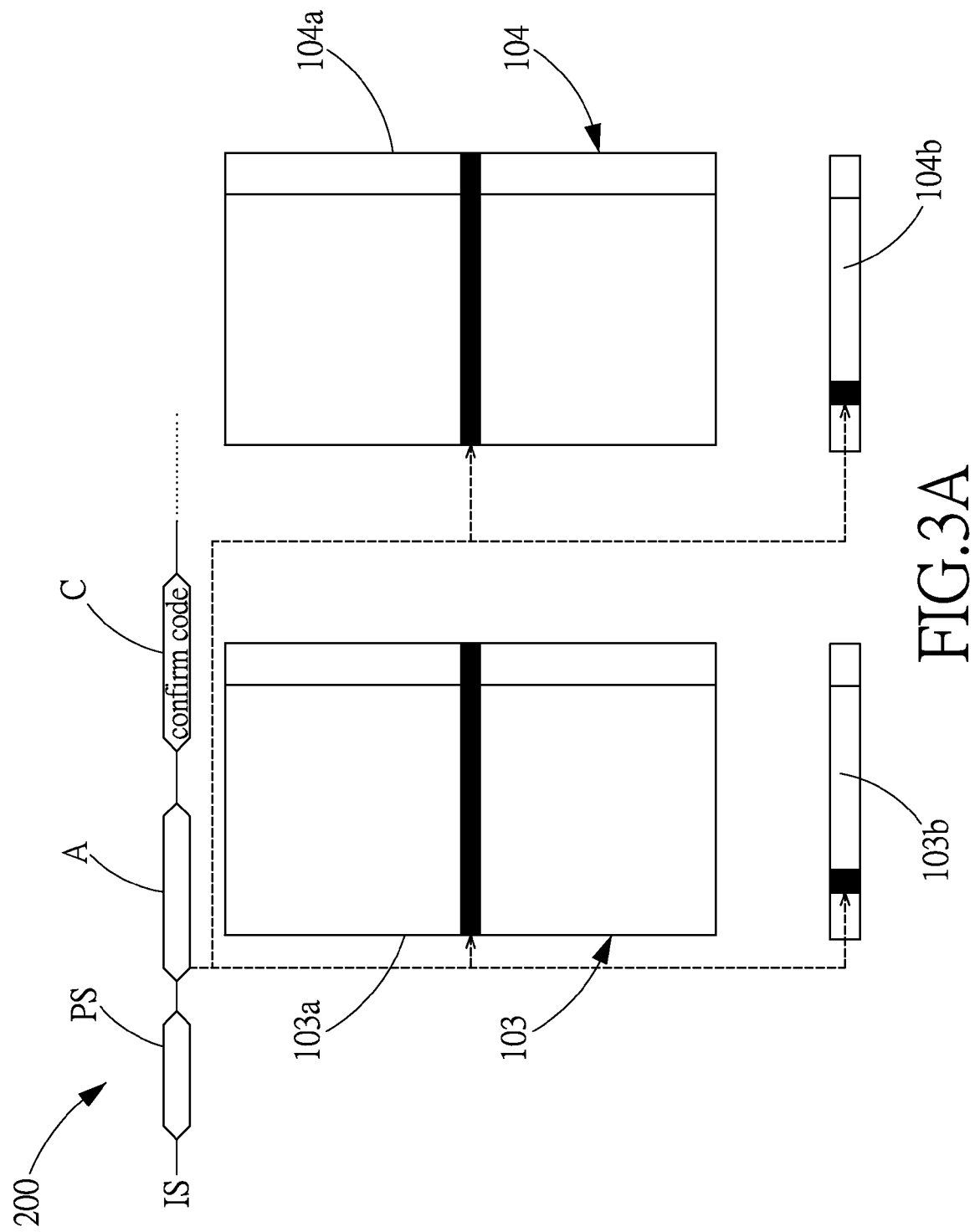
FIG. 3A shows a simultaneously accessible memory device in accordance with a third embodiment of the present invention.

Referring then to FIG. 3A, a memory device 200 in accordance with a third embodiment of the present invention is reading a Page of data simultaneously from two memory arrays via a PS (preset instruction). The decision unit 102a of this embodiment employs the first AND gate 21 and the second AND gate 22 to decide whether it is a PS.

In a preferred embodiment, when the IS is a PS, and the PS is decoded by the instruction decoding unit 101, the ES1 and ES2 will become the signal of a logic 1. Therefore, the first and second AND gates 21, 22 will select and enable a page of the memory arrays 103a, 104a via the address code A of the DS. In other words, the memory device 200 selects the page to be read via the address code 11b, then the address code A simultaneously enables the first memory array 103a, the first page buffer 103b, the second memory array 104a and the second page buffer 104b, namely, enabling the first and second memories 103, 104 to perform read operation simultaneously, and then the confirm code C confirms the read operation.

On the contrarily, if the IS is a NS, in the embodiment, the ES1 is a signal of the logic 1, and the ES2 is a signal of a logic 0, the first AND gate 21 will use the address code A to enable the first memory array 103a and the first page buffer 103b.

Therefore, when the IS is a PS, the address code A selects the page to be read from the memory arrays 103a and 104a, and the ES1 and ES2 enable the first and second AND gates 21, 22. In other words, the CS simultaneously enable the first memory array 103a, the first page buffer 103b, the second memory array 104a and the second page buffer 104b. On the contrarily, when the IS is a NS, since the ES2 is logic 0, the second AND gate 22 will be disabled. At this moment, the address code A selects the page to be read from the memory array 103a, the CS will enable the first memory array 103a and the first page buffer 103b.

In a preferred embodiment, the first memory 103 further comprises a first line decoding unit 103c and a first column decoding unit 103d which are connected to the control and logic unit 102. The second memory 104 comprises a second line decoding unit 104c and a second column decoding unit 104d which are connected to the control and logic unit 102.

As mentioned above, when the IS is a PS, the CS of the control and logic unit 102 will simultaneously enable the first line decoding unit 103c, the first column decoding unit 103d, the second line decoding unit 104c and the second column decoding unit 104d. Therefore, the memory device 200 is able to read the data stream from the first and second memory arrays 103a, 104a.

Due to the fact that the IS of the prior art memory device 11 will be longer than the IS of the present invention when it comes to the reading of two memory arrays 103a, 104a, it will take much more time for the prior art memory device 11 to process the IS as compared to the memory device 200 of the present invention. Therefore, using the PS to operate the memory device 200 can enhance the read speed of the memory device 200 of the present invention.

Figure 3B:
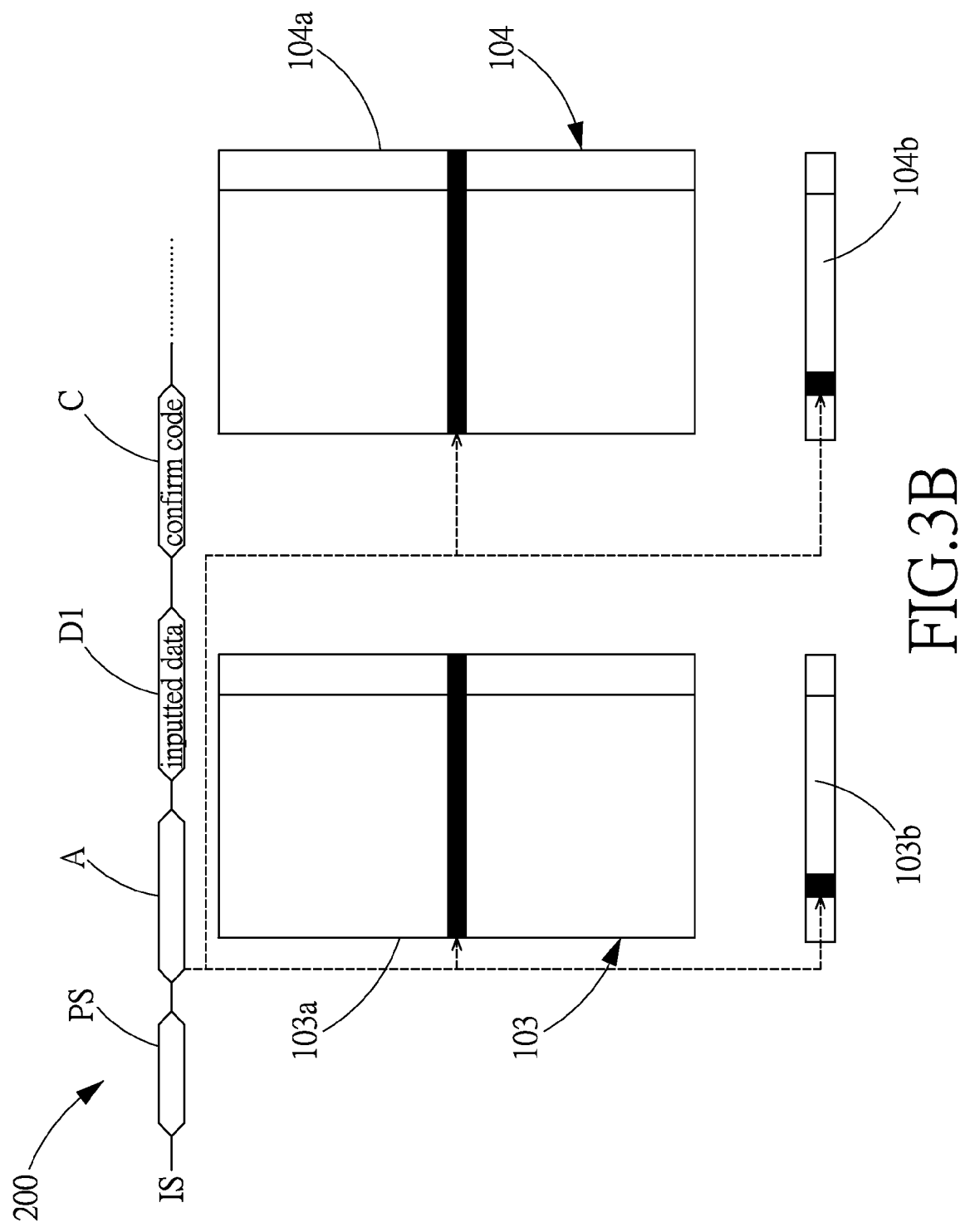
FIG. 3B shows a simultaneously accessible memory device in accordance with a fourth embodiment of the present invention.

Referring then to FIG. 3B, a memory device 200 in accordance with a fourth embodiment of the present invention is programming data into a page of the two memory arrays 103a, 104a, simultaneously. When the IS is a PS, and the PS is decoded by the instruction decoding unit 101, the ES1 and ES2 will become the signal of a logic 1. Therefore, the first and second AND gates 21, 22 will select and enable a page of the memory arrays 103a, 104a via the address code A of the DS. In other words, the memory device 200 selects the page to be written via the address code 11b, then the address code A simultaneously enables the first memory array 103a, the first page buffer 103b, the second memory array 104a and the second page buffer 104b, enabling the IN (inputted data) to be written into the first and second memories 103, 104. Therefore, the first and second memories 103, 104 write the inputted data D1 simultaneously, and the confirm code C confirms the program operation.

The IS of the prior art memory device 11 will be longer than the IS of the present invention when it comes to the writing of two memory arrays 103*a*, 104*a*, namely, it will take much more time for the prior art memory device 11 to process the IS as compared to the memory device 200 of the present invention. Therefore, using the PS to operate the memory device 200 can enhance the write speed of the memory device 200 of the present invention. Besides, doing multiple access the backup data with a relatively short IS (inputted instruction) can enhance the reliability of the memory device 200 of the present invention.

Referring then to FIG. 3C, a memory device 200 in accordance with a fifth embodiment of the present invention is erasing data from the two memory arrays 103*a*, 104*a*, simultaneously. When the IS is a PS, and the PS is decoded by the instruction decoding unit 101, the ES1 and ES2 will become the signal of a logic 1. Therefore, the first and second AND gates 21, 22 will enable a page of the memory arrays 103*a*, 104*a* via the address code A of the DS. In other words, the memory device 200 selects the memory block to be erased via the address code 11*b*, then the address code A simultaneously enables the first memory array 103*a*, the first page buffer 103*b*, the second memory array 104*a* and the second page buffer 104*b* to do the erase operation, and the confirm code C confirms the erase operation.

Figure 4:
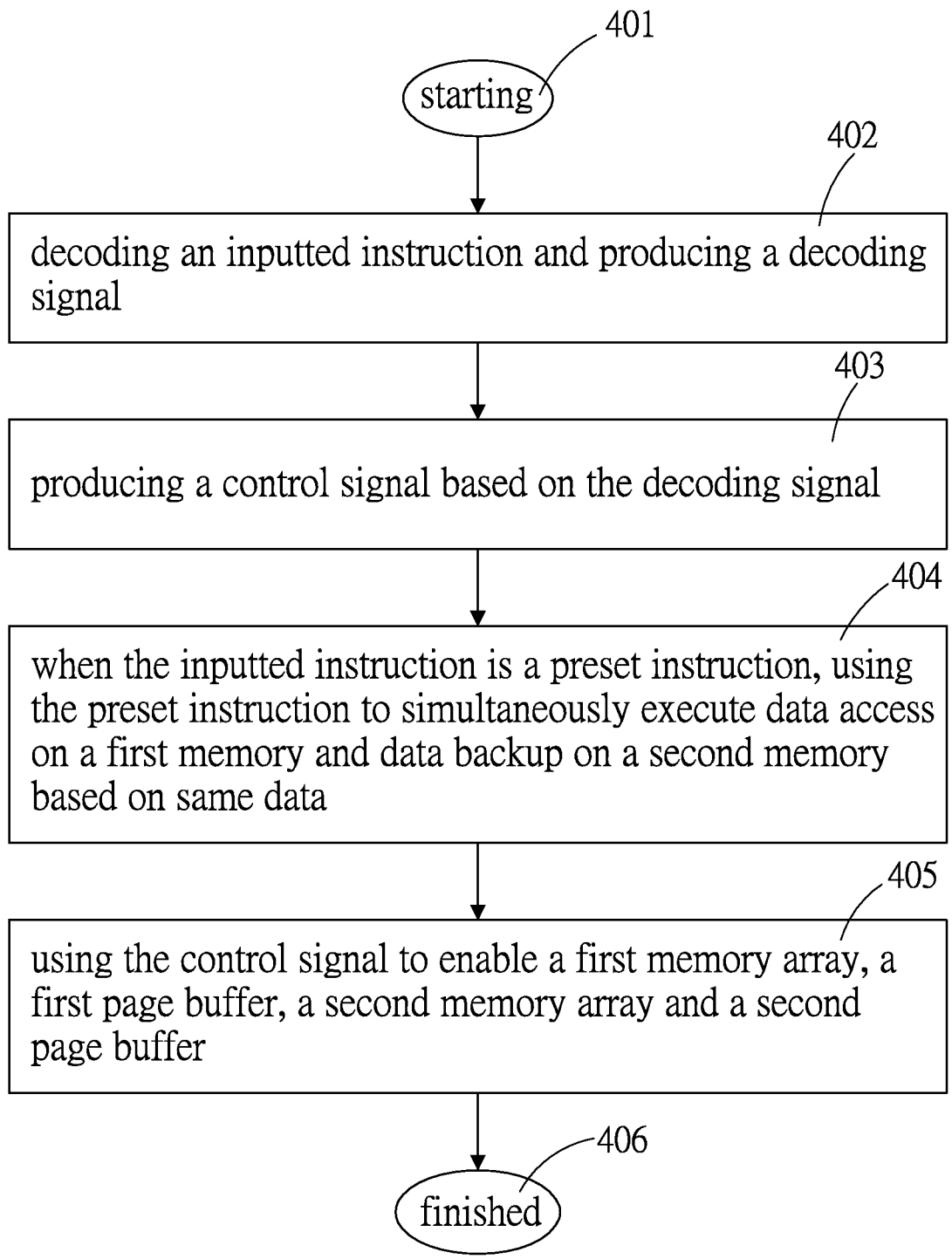
FIG. 4 is a flow chart showing a method for using the simultaneously accessible memory device of the present invention.

Referring to FIG. 4, which is a flow chart showing a method for using the memory device of the present invention, in a preferred embodiment, the method is for using a nonvolatile memory device and comprises the following steps:

Step 401: starting;

Step 402: decoding an inputted instruction and producing a decoding signal;

Step 403: producing a control signal based on the decoding signal:

Step 404: when the inputted instruction is a preset instruction, using the preset instruction to simultaneously execute data access on a first memory and access the backup data on a second memory based on same data;

Step 405: using the control signal to enable a first memory array, a first page buffer, a second memory array and a second page buffer; and Step 406: finished.

In summary, the memory device of the present invention and the method for using the same enable the first and second memory arrays to perform read, program and erase operation simultaneously via the preset instruction. Unlike the prior art memory device which requires the use of two normal instructions at two different times, the memory device of the present invention can simultaneously process the first and second memory arrays by using the preset instruction. Besides, the preset instruction is shorter than the prior art normal instruction, which reduces processing time of the memory device. Furthermore, the preset instruction enables the first and second memory arrays to perform read, write and erase operations simultaneously, which enhances the reliability of the memory device.

While we have shown and described various embodiments in accordance with the present invention, it is clear to those skilled in the art that further embodiments may be made without departing from the scope of the present invention.

What is claimed is:

1. A simultaneously accessible memory device comprising:

an instruction decoding unit for decoding an inputted instruction and producing a decoding signal;

a control and logic unit producing a control signal based on the decoding signal;

a first memory with a first memory array and a first page buffer; and a second memory with a second memory array and a second page buffer;

when the inputted instruction is a preset instruction, the preset instruction is used to execute data access on the first memory and access a backup data on the second memory based on a same data, namely, the same data is read from or written into the first and second memories simultaneously;

when the inputted instruction is a preset instruction, the control signal of the control and logic unit simultaneously enables the first memory array, the first page buffer, the second memory array and the second page buffer;

when the inputted instruction is a normal instruction, the control signal of the control and logic unit simultaneously enables the first memory array and the first page buffer;

the control and logic unit comprises a decision unit which is used to decide whether the inputted instruction is a preset instruction or a normal instruction, and the decoding signal includes a first enable signal and a second enable signal;

the decision unit comprises:

a first AND gate has a first end connected to an address code and a second end connected to the first enable signal;

a second AND gate has a third end connected to the address code and the first end and a fourth end connected to the second enable signal;

when the inputted instruction is a preset instruction, the first and second enable signals enable the first and second AND gates, making the control signal simultaneously enable the first memory array, the first page buffer, the second memory array and the second page buffer, when the inputted instruction is a normal instruction, the first AND gate is enabled, and the second AND gate is disabled, making the control signal simultaneously enable the first memory array and the first page buffer.

2. The simultaneously accessible memory device as claimed in claim 1, wherein the preset instruction is a data access and backup instruction which comprises a first instruction to activate the first memory and a second instruction to activate the second memory.

3. The simultaneously accessible memory device as claimed in claim 1, wherein the backup means that the first and second memories execute the same operation at the same time.

4. The simultaneously accessible memory device as claimed in claim 1, wherein the first memory comprises: a first line decoding unit and a first column decoding unit which are connected to the control and logic unit, the second memory comprises a second line decoding unit and a second column decoding unit which are connected to the control and logic unit;

when the inputted instruction is a preset instruction, the control signal of the control and logic unit simultaneously enables the first line decoding unit, the first column decoding unit, the second line decoding unit and the second column decoding unit.

5. The simultaneously accessible memory device as claimed in claim 4, wherein the memory device is a NAND flash memory.

6. The simultaneously accessible memory device as claimed in claim 1, wherein the preset instruction is used in the read, program and erase operations.

7. The simultaneously accessible memory device as claimed in claim 6, wherein the memory device is a solid state disk or any other commercially available memory devices.

* * * * *